(12) United States Patent
Kim

(10) Patent No.: US 12,555,834 B2
(45) Date of Patent: Feb. 17, 2026

(54) SYSTEM AND METHOD FOR INSPECTING OUTER APPEARANCE

(71) Applicant: LG Energy Solution, Ltd., Seoul (KR)

(72) Inventor: Geun Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/701,788

(22) PCT Filed: Dec. 19, 2022

(86) PCT No.: PCT/KR2022/020735
§ 371 (c)(1),
(2) Date: Apr. 16, 2024

(87) PCT Pub. No.: WO2023/121188
PCT Pub. Date: Jun. 29, 2023

(65) Prior Publication Data
US 2024/0405301 A1   Dec. 5, 2024

(30) Foreign Application Priority Data

Dec. 20, 2021 (KR) .................. 10-2021-0183208

(51) Int. Cl.
*H01M 10/42* (2006.01)
*G01N 21/84* (2006.01)
(Continued)

(52) U.S. Cl.
CPC .... *H01M 10/4285* (2013.01); *G01N 21/8806* (2013.01); *H01M 10/48* (2013.01);
(Continued)

(58) Field of Classification Search
CPC ............. H01M 10/4285; H01M 10/48; H01M 10/0422; H01M 10/42; H01M 10/04;
(Continued)

(56) References Cited

U.S. PATENT DOCUMENTS

2018/0284038 A1* 10/2018 Shinomiya ........... B25J 15/0019
2020/0235433 A1*  7/2020 Kim .................. H01M 10/0585
(Continued)

FOREIGN PATENT DOCUMENTS

JP     S53125057 A    11/1978
JP     H11132758 A     5/1999
(Continued)

OTHER PUBLICATIONS

English translation (Year: 2019).*
(Continued)

*Primary Examiner* — Fernando Alcon
(74) *Attorney, Agent, or Firm* — Lerner David LLP

(57) ABSTRACT

An outer appearance inspection system, which inspects an outer appearance of a secondary battery, according to the present invention includes a transfer device, which transfers the secondary battery according to an inspection position, a top and bottom inspecting device, which is disposed at a first inspection position and inspects an upper portion and a lower portion of the secondary battery, a side surface inspecting device, which is disposed at a second inspection position and inspects a side surface of the secondary battery and the secondary battery for swelling, and a rotating device which is disposed at the second inspection position and rotates the secondary battery, wherein the side surface inspecting device inspects the side surface of the secondary battery and the secondary battery for swelling in a state in which the secondary battery lies on the transfer device.

14 Claims, 7 Drawing Sheets

(51) Int. Cl.
*G01N 21/88* (2006.01)
*G06V 10/145* (2022.01)
*H01M 10/48* (2006.01)
*H04N 13/254* (2018.01)

(52) U.S. Cl.
CPC ..... *H04N 13/254* (2018.05); *G01N 2021/845* (2013.01); *G06V 10/145* (2022.01)

(58) Field of Classification Search
CPC ......... G01N 21/8806; G01N 2021/845; G01N 21/952; G01N 2021/8841; G01N 21/8851; G01N 2021/8854; G01N 2201/1042; G01N 2201/1047; H04N 13/254; G06V 10/145; Y02E 60/10; Y02P 70/50
See application file for complete search history.

(56) References Cited

U.S. PATENT DOCUMENTS

| | | | |
|---|---|---|---|
| 2020/0350637 A1* | 11/2020 | You | G01N 23/046 |
| 2021/0184280 A1* | 6/2021 | Kim | G01N 21/9515 |
| 2021/0302324 A1* | 9/2021 | Yoon | G01N 21/8851 |
| 2022/0245784 A1* | 8/2022 | Kim | H04N 23/56 |
| 2022/0271267 A1* | 8/2022 | Mashimo | H01M 4/0435 |
| 2022/0357287 A1* | 11/2022 | Lee | H01M 10/42 |
| 2023/0140040 A1* | 5/2023 | Maeda | G01R 31/3865 324/426 |
| 2023/0155101 A1* | 5/2023 | Park | B26D 1/065 29/623.1 |
| 2023/0304947 A1* | 9/2023 | Kim | G01N 23/18 |
| 2023/0342904 A1* | 10/2023 | Kim | B25J 11/005 |
| 2023/0342910 A1* | 10/2023 | Kim | H04N 23/56 |
| 2024/0291120 A1* | 8/2024 | Che | H01M 50/152 |
| 2025/0118817 A1* | 4/2025 | Shim | H01M 10/4285 |
| 2025/0208222 A1* | 6/2025 | Oh | H01M 10/4285 |

FOREIGN PATENT DOCUMENTS

| | | |
|---|---|---|
| JP | 2003156453 A | 5/2003 |
| JP | 2004093222 A | 3/2004 |
| JP | 2007033284 A | 2/2007 |
| JP | 2012002605 A | 1/2012 |
| JP | 2017049096 A | 3/2017 |
| JP | 2017173048 A | 9/2017 |
| KR | 100216171 B1 | 8/1999 |
| KR | 20020070691 A | 9/2002 |
| KR | 20110018083 A | 2/2011 |
| KR | 101030449 B1 | 4/2011 |
| KR | 20180092773 A | 8/2018 |
| KR | 101954416 B1 | 3/2019 |
| KR | 102000906 B1 | 7/2019 |
| KR | 102028360 B1 | 10/2019 |
| KR | 102035309 B1 | 10/2019 |
| KR | 102142687 B1 | 8/2020 |
| KR | 20200141856 A | 12/2020 |
| KR | 20210037330 A | 4/2021 |
| KR | 102272469 B1 | 7/2021 |
| KR | 20210118322 A | 9/2021 |

OTHER PUBLICATIONS

International Search Report for Application No. PCT/KR2022/020735 dated Mar. 24, 2023, 2 pages.
Extended European Search Report including Written Opinion for Application No. 22911821.1, dated Jan. 8, 25, 10 pages.

* cited by examiner

SYSTEM AND METHOD FOR INSPECTING OUTER APPEARANCE

CROSS-REFERENCE TO RELATED APPLICATIONS

This application is a national stage entry under 35 U.S.C. § 371 of International Application No. PCT/KR2022/020735, filed on Dec. 19, 2022, which claims priority to Korean Patent Application No. 10-2021-0183208, filed on Dec. 20, 2021, the disclosures of which are hereby incorporated by reference in their entireties.

TECHNICAL FIELD

The present invention relates to a system and method for inspecting an outer appearance, and more particularly, to a system and method for inspecting an outer appearance of a secondary battery, which inspects whether there is a defect on the outer appearance of the manufactured secondary battery.

BACKGROUND ART

Recently, as prices of energy sources rise due to depletion of fossil fuels and interests about environmental pollution are amplified, a need for eco-friendly alternative energy sources is indispensable for life in the future. Accordingly, research continues on various power generation technologies using sunlight, wind power, tidal power, and so on, and there is also a continuing great interest in power storage systems, such as batteries, for more efficiently using electrical energy generated through the technologies.

Moreover, as the technical development of and a demand for mobile electronic devices and electric vehicles using batteries increase, a demand for batteries as energy sources rapidly increases. Accordingly, much research is conducted on batteries that can meet the various needs.

Batteries that store electrical energy may be generally classified into primary batteries and secondary batteries. While the primary batteries are disposable consumable batteries, the secondary batteries are rechargeable batteries manufactured using a material in which a redox process between a current and a substance is repeatable. That is, when a reduction reaction is performed on the material by the current, a power supply is charged, and when an oxidation reaction is performed on the material, the power supply is discharged. Such a charging-discharging is repeatedly performed to generate electricity.

In particular, lithium secondary batteries such as lithium-ion batteries and lithium-ion polymer batteries, which have advantages such as high energy density, discharge voltage, and output stability, are in high demand in terms of a material.

Secondary batteries are rechargeable unlike primary batteries, and classified into a coin type battery, a cylinder type battery, a prismatic type battery, and a pouch type battery according to the shape of cases.

The secondary batteries made through a manufacturing process are inspected for an occurrence of defect, and a defective product is discriminated accordingly. It may be primarily inspected whether an outer appearance of each of the secondary batteries is defective. Here, it is inspected whether there are scratches, wrinkles, or the like, on the outer appearance and whether swelling occurs in the secondary battery.

When a side surface of a cylinder type secondary battery is inspected during inspection of an outer appearance of the cylinder type secondary battery, the inspection of the side surface is carried out while allowing the cylinder type secondary battery to rotate in an upright state. Thus, there is a case in which the inspection of the outer appearance is not properly carried out on a portion at which the cylinder type secondary battery is gripped. In addition, as the size and the capacity of the cylinder type secondary battery increase, there are also problems that stability decreases during transfer and accuracy of the inspection decreases.

In order to solve these problems, there is a need for an outer appearance inspection method for the secondary battery, which is capable of precisely inspecting the entire outer appearance of the secondary battery, capable of stably transferring even the secondary battery having an increased size and capacity, and improves accuracy of the inspection.

DISCLOSURE OF THE INVENTION

Technical Problem

The present invention has been devised to solve the problems as above and an object of the present invention is to provide a system and method for inspecting an outer appearance of a secondary battery, which precisely inspect the entire outer appearance of the secondary battery by modifying an inspecting device that inspects the outer appearance of the secondary battery, increase stability during transfer of the secondary battery by modifying a transfer device that transfers the secondary battery to be inspected, and improve accuracy of the outer appearance inspection of the secondary battery.

Technical Solution

An outer appearance inspection system, which inspects an outer appearance of a secondary battery, according to the present invention may include a transfer device, which transfers the secondary battery according to an inspection position, a top and bottom inspecting device, which is disposed at a first inspection position and inspects an upper portion and a lower portion of the secondary battery, a side surface inspecting device, which is disposed at a second inspection position and inspects a side surface of the secondary battery and the secondary battery for swelling, and a rotating device which is disposed at the second inspection position and rotates the secondary battery, wherein the side surface inspecting device inspects the side surface of the secondary battery and the secondary battery for swelling in a state in which the secondary battery lies on the transfer device.

The transfer device may be a conveyor including a linear motion guide, and the secondary battery may be transferred by a linear motion of the linear motion guide.

The top and bottom inspecting device may include an upper portion inspecting machine, which inspects the upper portion of the secondary battery, and a lower portion inspecting machine which inspects the lower portion of the secondary battery, and the top and bottom inspecting device may be provided with a camera therein.

The rotating device may include a first rotating machine, which is disposed at an entrance of the second inspection position and rotates the secondary battery so that a longitudinal direction of the secondary battery and a traveling direction of the transfer device are parallel to each other, before the inspection at the second inspection position is carried out.

The side surface inspecting device may be a three-dimensional (3D) camera including a light source device, which emits light along the side surface of the secondary battery, and a mirror which reflects the light emitted by the Light source device.

The side surface inspecting device may include a first side surface inspecting machine, which inspects a portion of the side surface of the secondary battery, and a second side surface inspecting machine that inspects a portion of the side surface of the secondary battery, which is not inspected by the first side surface inspecting machine.

The rotating device may include a second rotating machine, which is disposed between the first side surface inspecting machine and the second side surface inspecting machine and rotates the secondary battery at an angle of 180 degrees so that a top surface and a bottom surface of the secondary battery are reversed.

The outer appearance inspection system may further include a loading device that loads as many as a preset number of the secondary battery, of which the outer appearance is subject to inspection, on the transfer device.

The outer appearance inspection system may further include a discriminating device that discriminates the secondary battery according to an inspection result measured by the top and bottom inspecting device and the side surface inspecting device.

The outer appearance inspection system may further include a first conveyor, which is connected to the discriminating device and transfers the discriminated secondary battery, and a second conveyor which is connected to the first conveyor and transfers the secondary battery that is abnormal.

The first conveyor may be a pocket conveyor including a pocket in which each of the discriminated secondary batteries is put individually.

An outer appearance inspection method, which inspects an outer appearance of a cylindrical type secondary battery, may include a loading process of loading the secondary battery, of which an outer appearance is subject to inspection, on a transfer device by a loading device, a transferring process of transferring the secondary battery by the transfer device, a top and bottom inspecting process of inspecting an upper portion and a lower portion of the secondary battery by a top and bottom inspecting device, a first rotating process of rotating the secondary battery by a first rotating machine so that a longitudinal; direction of the secondary battery and a traveling direction of the transfer device are parallel to each other, a first side surface inspecting process of inspecting a portion of a side surface of the secondary battery by a first side surface inspecting machine, a second rotating process of rotating the secondary battery at an angle of 180 degrees by a second rotating machine so that a top surface and a bottom surface of the secondary battery are reversed, and a second side surface inspecting process of inspecting a portion of the side surface of the secondary battery, which is not inspected in the first side surface inspecting process, by a second side surface inspecting machine.

In the transferring process, the secondary battery may be transferred by a linear motion of a linear motion guide by the transfer device including the linear motion guide.

In the first side surface inspecting process and the second side surface inspecting process, each of the first side surface inspecting machine and the second side surface inspecting machine may be a 3D camera including a light source device, which emits light along the side surface of the secondary battery, and a mirror which reflects the light emitted by the Light source device.

The outer appearance inspection method may further include a discriminating process of discriminating the secondary battery after the inspecting of the outer appearance according to a measured inspection result by a discriminating device.

Advantageous Effects

The outer appearance inspection system, which inspects the outer appearance of the secondary battery, according to the present invention includes the transfer device, which transfers the secondary battery according to the inspection position, the top and bottom inspecting device, which is disposed at the first inspection position and inspects the upper portion and the lower portion of the secondary battery, the side surface inspecting device, which is disposed at the second inspection position and inspects the side surface of the secondary battery and the secondary battery for the swelling, and the rotating device which is disposed at the second inspection position and rotates the secondary battery. The side surface inspecting device inspects the side surface of the secondary battery and the secondary battery for the swelling in the state in which the secondary battery lies on the transfer device.

Accordingly, the entire outer appearance of the secondary battery may be precisely inspected, the false inspection may be minimized, and the shaking during the transfer of the secondary battery may be minimized to improve the stability. In addition, the accuracy of the outer appearance inspection of the secondary battery may be improved, and the outer appearance defect may be minimized.

MODE FOR CARRYING OUT THE INVENTION

Figure 1:
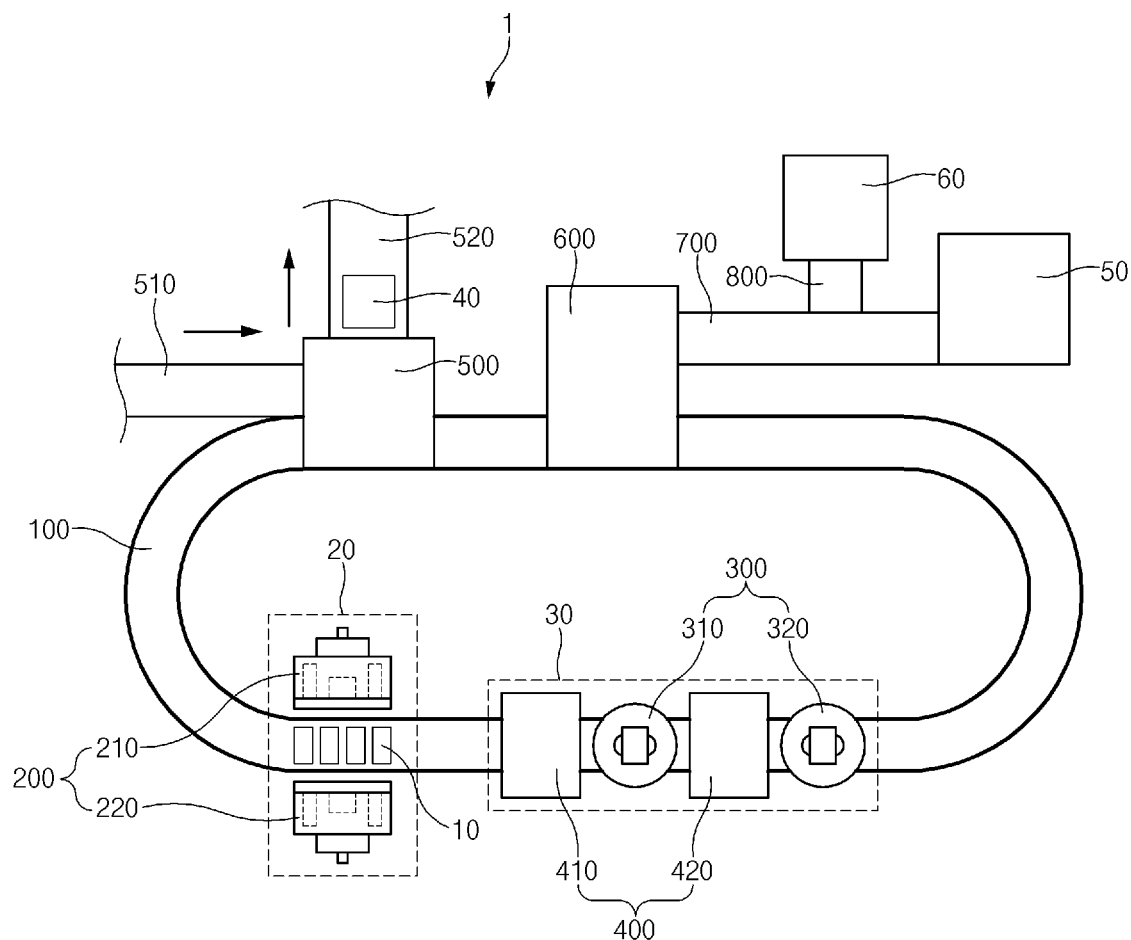
FIG. 1 is a schematic plan view illustrating an outer appearance inspection system according to Embodiment 1 of the present invention.

Hereinafter, preferred embodiments of the present invention will be described in detail with reference to the accompanying drawings to enable those skilled in the art to which the present invention pertains to easily carry out the present invention.

The present invention may, however, be embodied in different forms and should not be construed as limited by the embodiments set forth herein. The parts unrelated to the description, or the detailed descriptions of related well-known art that may unnecessarily obscure subject matters of the present invention, will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

The present invention provides an outer appearance inspection system as Embodiment 1.

FIG. 1 is a schematic plan view illustrating an outer appearance inspection system 1 according to Embodiment 1 of the present invention.

Referring to FIG. 1, the outer appearance inspection system 1 for inspecting an outer appearance of a secondary battery 10 may include a transfer device 100, a top and bottom inspecting device 200, a side surface inspecting device 300, and a rotating device 400.

Figure 2A:
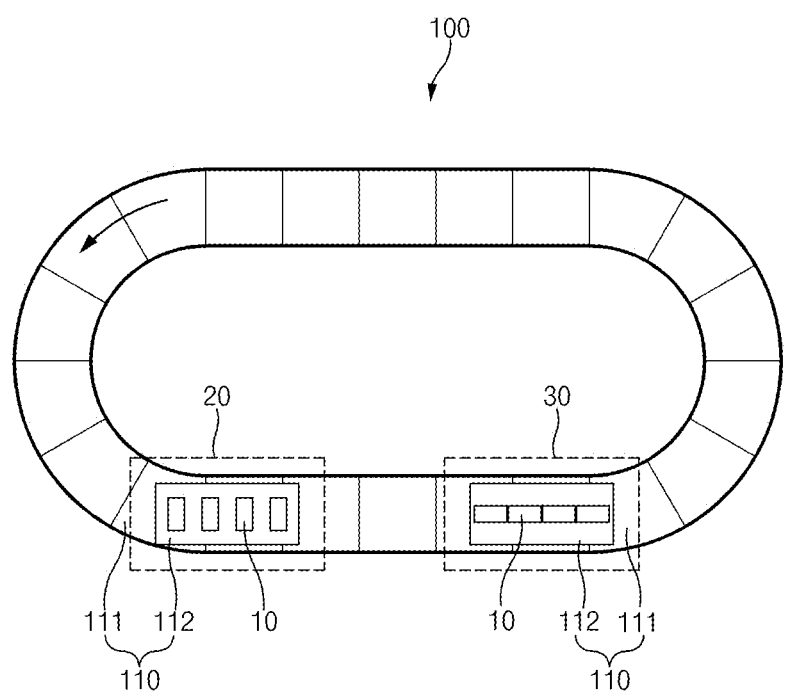
FIG. 2a is a schematic plan view illustrating a transfer device of an outer appearance inspection system according to Embodiment 1 of the present invention.
Figure 2B:
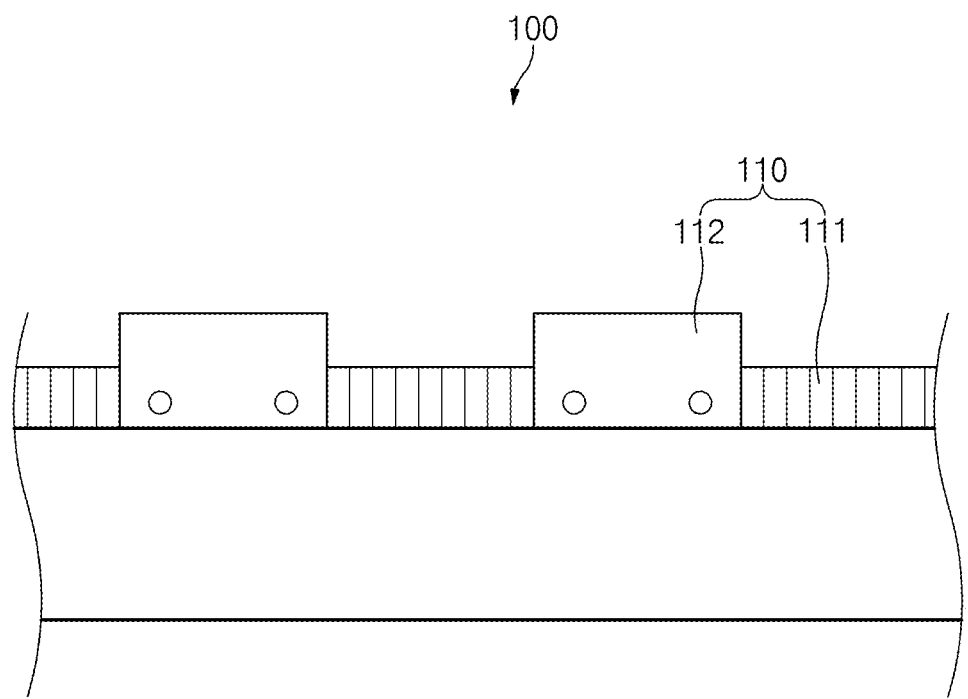
FIG. 2b is a schematic side view illustrating a transfer device of an outer appearance inspection system according to Embodiment 1 of the present invention.

FIGS. 2a and 2b are a plan view and a side view, respectively, each of which schematically illustrates the transfer device 100 of the outer appearance inspection system 1 according to Embodiment 1 of the present invention.

The secondary battery 10 may move to an inspection position, at which each of inspections is carried out, for the outer appearance inspection of the secondary battery 10. As an example of a component for transferring the secondary battery 10 according to the inspection position, the outer appearance inspection system 1 according to Embodiment 1 of the present invention may include the transfer device 100.

Referring to FIGS. 2a and 2b, the transfer device 100 may have a shape of a conveyor. When the transfer device 100 has the shape of a conveyor, the secondary battery 10 may be transferred on a top surface of the transfer device 100 according to proceeding of the conveyor.

A path along which the secondary battery 10 is transferred on the transfer device 100 may have an oval shape when the transfer device 100 is viewed downward from top. The secondary battery 10 may be inspected while moving along the path having an oval shape.

A first inspection position 20 may be provided at a left lower portion, and a second inspection position 30 may be provided at a right lower portion on the top surface of the transfer device 100 in FIG. 2a. However, each of the inspection positions is just one example and thus, is not necessarily limited thereto. The inspection positions may be provided at other positions.

A top and bottom inspection for the secondary battery 10 may be carried out at the first inspection position 20, and side surface and swelling inspections for the secondary battery 10 may be carried out at the second inspection position 30. Each of the inspections will be described later in detail again.

The secondary battery 10 subject to inspection may start to be transferred from a left upper portion by the transfer device 100, on the top surface of the transfer device 100 in FIG. 2a. Here, the secondary battery 10 may be transferred in a lying state so that a longitudinal direction and a proceeding direction of the secondary battery 10 are perpendicular to each other. For example, in FIG. 2a, when the secondary battery 10 is a cylindrical type, the secondary battery 10 may start to be transferred in a lying state so that an axial direction thereof matches an up and down direction in FIG. 2a. For reference, the secondary battery 10 is not limited to an example of the present invention, and may have various types of various shapes.

As an example of a component for efficiently transferring the secondary battery 10, the transfer device 100 of the outer appearance inspection system 1 according to Embodiment 1 of the present invention may be a conveyor including a linear motion guide 110.

When the transfer device 100 is the conveyor including the linear motion guide 110, the secondary battery 10 may be transferred to each of the inspection positions by a linear motion of the linear motion guide 110 during the outer appearance inspection.

The linear motion guide 110 may be generally constituted by a rail 111 and a block 112 that moves along the rail 111. Thus, the transfer device 100 may include the linear motion guide 110 having a configuration, in which the block 112 moves along the rail 111 provided on the top surface of the transfer device 100, and the secondary battery 10 to be inspected may be transferred while lying on a top surface of the block 112.

When the transfer device 100 is the conveyor including the linear motion guide 110, there may be an effect that shaking is minimized to improve stability when the secondary battery 10 is transferred. In addition, a transfer speed may be adjusted according to the inspection process.

Figure 3:
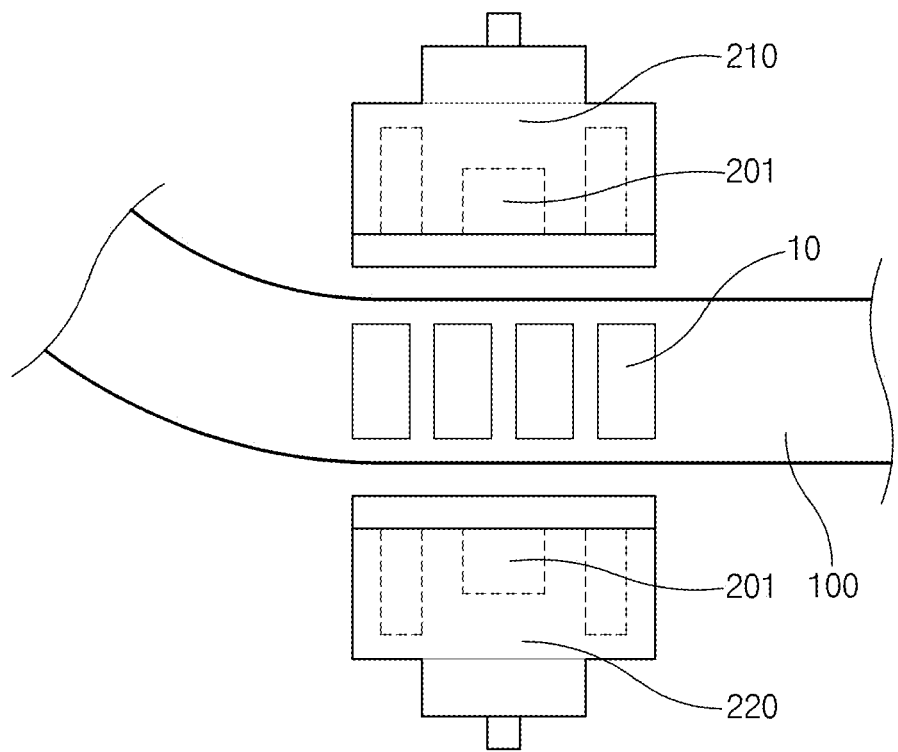
FIG. 3 is a schematic plan view illustrating a top and bottom inspecting device of an outer appearance inspection system according to Embodiment 1 of the present invention.

FIG. 3 is a schematic plan view illustrating a top and bottom inspecting device 200 of the outer appearance inspection system 1 according to Embodiment 1 of the present invention.

When the secondary battery 10 transferred by the transfer device 100 reaches the first inspection position 20, the inspection of an upper portion and a lower portion of the secondary battery 10 may be carried out. As an example of a component for inspecting the upper portion and the lower portion of the secondary battery 10, the outer appearance inspection system 1 according to Embodiment 1 of the present invention may include the top and bottom inspecting device 200.

Referring to FIG. 3, the top and bottom inspecting device 200 may be disposed at the first inspection position 20 and inspect the upper portion and the lower portion of the secondary battery 10. Specifically, the upper portion and the lower portion of the secondary battery 10 may be inspected through the top and bottom inspecting device 200 for determining whether wrinkles, dents, scratches, foreign matters, contaminant, discoloration, short-circuit marks, or the like occur.

For the efficient outer appearance inspection for the upper portion and the lower portion of the secondary battery 10, the top and bottom inspecting device 200 may include an upper portion inspecting machine 210, which inspects the upper portion of the secondary battery 10, and a lower portion inspecting machine 220 which inspects the lower portion of the secondary battery 10.

The upper portion inspecting machine 210 and the lower portion inspecting machine 220 of the top and bottom inspecting device 200 may be disposed at both sides, respectively, of the transfer device 100 at the first inspection position 20. Thus, in FIG. 2a, the upper portion inspecting machine 210 may be disposed at an upper side and the lower portion inspecting machine 220 may be disposed at a lower side at the first inspection position 20. As the upper portion and the lower portion of the secondary battery 10 may be inspected simultaneously, the position of the upper portion inspecting machine 210 and the position of the lower portion inspecting machine 220 may be switched.

A camera 201 may be provided inside each of the upper portion inspecting machine 210 and the lower portion inspecting machine 220 of the top and bottom inspecting device 200. The camera 201 provided in the inside may photograph conditions of the upper and lower outer appearances of the secondary battery 10 to inspect whether there is an abnormality.

As the top and bottom inspecting device 200 of the outer appearance inspection system 1 has the camera 201 provided therein and includes the upper portion inspecting machine 210 and the lower portion inspecting machine 220, the upper and lower outer appearances of the secondary battery 10 in the lying state on the top surface of the transfer device 100 may be simultaneously inspected. Thus, a time and a space may be reduced to increase efficiency of the inspection process.

The secondary battery 10 after the inspection of the upper portion and the lower portion by the top and bottom inspecting device 200 may be transferred by the transfer device 100 and reach the second inspection position 30. The secondary battery 10 that reaches the second inspection position 30 may be inspected for conditions of an outer appearance of the side surface and for swelling. As an example of a component for inspecting the secondary battery 10 for conditions of the side surface and for swelling, the outer appearance inspection system 1 according to Embodiment 1 of the present invention may include the side surface inspecting device 300.

The side surface inspecting device 300 may be disposed at the second inspection position 30 and inspect the secondary battery 10 for conditions of the side surface and for swelling. Specifically, the side surface of the secondary battery 10 may be inspected through the side surface inspecting device 300 for whether there are wrinkles, dents, scratches, rust, foreign matters, contaminant, discoloration, or the like, and for whether other identifying phrases match a product. In addition, the secondary battery 10 may be inspected for defect through the inspection for swelling.

In the related art, when the secondary battery 10 is a cylindrical type, the outer appearance inspection for the side surface is carried out in a state in which the secondary battery 10 stands upright. Thus, this is a method in which the secondary battery 10 is fixed for the inspection and the side surface of the secondary battery 10 is inspected while the secondary battery 10 rotates. However, there is a problem that the outer appearance inspection is inefficient in a portion gripped to fix the secondary battery 10.

As an example of a component for solving this problem, the side surface inspecting device 300 of the outer appearance inspection system 1 according to Embodiment 1 of the present invention may be a 3D camera including a light source device 301 and a mirror 302.

In the side surface inspecting device 300 that is the 3D camera, the light source device 301 may emit light along the side surface of the secondary battery 10, and the mirror 302 may reflect the light emitted by the Light source device 301.

As an example in which the side surface inspecting device 300 that is the 3D camera operates, the light source device 301 may emit the light having a specific pattern onto the side surface of the secondary battery 10, and a change amount of the pattern may be calculated to recognize the outer appearance of the secondary battery 10. In addition, the mirror 302 may reflect the light in order to increase an angle and range to carry out the inspection. Thus, data about the side surface of the secondary battery 10 may be acquired in a 3D type based on the change amount of the pattern caused by the light of the 3D camera. This is just one of operation modes of the 3D camera and thus, is not necessarily limited thereto.

The side surface inspecting device 300 may further include a unit such as a light unit, which additionally supplies light necessary for the operation of the 3D camera.

When the side surface inspecting device 300 is the 3D camera including the light source device 301 and the mirror 302, it is possible to inspect all portions of the side surface even though the secondary battery 10 has a shape like the cylindrical shape of which a side surface is a curved surface. Accordingly, there may be effects of improving detectability and minimizing false inspection.

Figure 4:
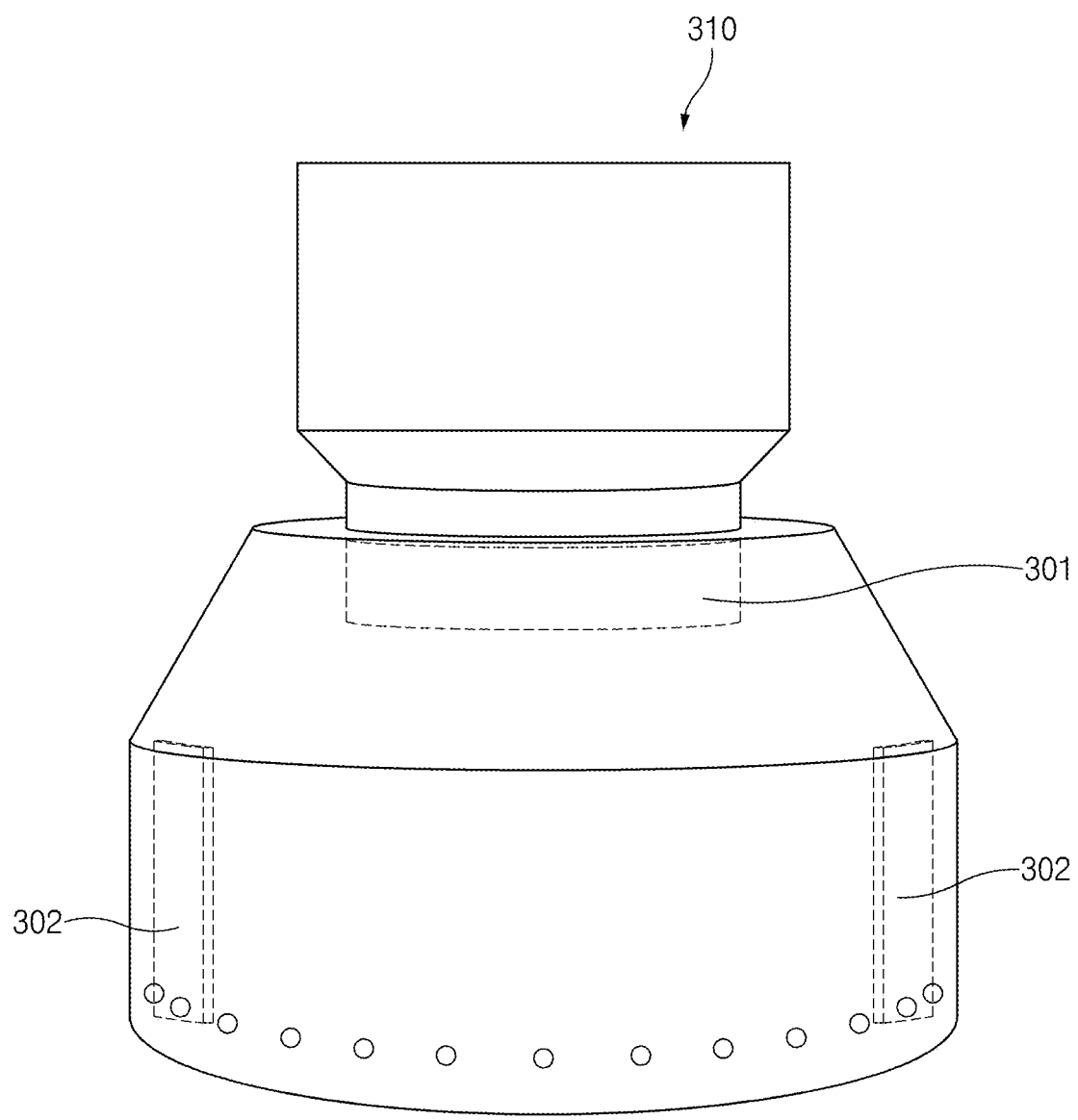
FIG. 4 is a schematic front view illustrating a first side surface inspecting machine of a side surface inspecting device of an outer appearance inspection system according to Embodiment 1 of the present invention.

FIG. 4 is a schematic front view illustrating a first side surface inspecting machine 310 of the side surface inspecting device 300 of the outer appearance inspection system 1 according to Embodiment 1 of the present invention.

As an example of a component for increasing the efficiency of the side surface inspection for the secondary battery 10, the side surface inspecting device 300 of the outer appearance inspection system 1 according to Embodiment 1 of the present invention may include a first side surface inspecting machine 310 and a second side surface inspecting machine 320.

The first side surface inspecting machine 310 may inspect a portion of the side surface of the secondary battery 10, and the second side surface inspecting machine 320 may inspect a portion of the side surface of the secondary battery 10, which is not inspected by the first side surface inspecting machine 310.

Preferably, each of the first side surface inspecting machine 310 and the second side surface inspecting machine 320 may be the 3D camera described above, which includes the light source device 301 and the mirror 302.

When the side surface inspecting device 300 includes the first side surface inspecting machine 310 and the second side surface inspecting machine 320, the secondary battery 10 after the inspection of the upper portion and the lower portion by the top and bottom inspecting device 200 may be inspected for conditions of the side surface and for swelling at the second inspection position 30 by the first side surface inspecting machine 310 and the second side surface inspecting machine 320.

Based on the order in which the secondary battery 10 passes the second inspection position 30 through the transfer device 100, the inspection of the secondary battery 10 may be carried out by the first side surface inspecting machine 310 in the first half, and carried out by the second side surface inspecting machine 320 in the second half. Thus, in FIG. 2a, the first side surface inspecting machine 310 may be disposed at a left side of the second inspection position 30, and the second side surface inspecting machine 320 may be disposed at a right side of the second inspection position 30. This is just one example and thus, the position of the first side surface inspecting machine 310 and the position of the second side surface inspecting machine 320 may be switched.

The secondary battery 10 after the inspection of the upper portion and the lower portion may be transferred by the transfer device 100 in the lying state on the top surface of the transfer device 100, and the disposed state may be changed at the second inspection position 30 by the rotating device 400. The rotating device 400 will be described in detail later.

In the secondary battery 10 after changing of the disposed state, a portion of the side surface may be inspected by the first side surface inspecting machine 310. As an example of the portion of the side surface, when the secondary battery 10 is a cylindrical type, a portion that rotates at an angle of 180 degrees on the side surface having a radius of 360 degrees may be inspected. The range of the portion of the side surface is not limited thereto and thus, may change.

The secondary battery 10 inspected by the first side surface inspecting machine 310 may be changed to be in the disposed state for inspection of the other side surface by the rotating device 400. The rotating device 400 will be described in detail later.

In the secondary battery 10 after the changing of the disposed state, the portion of the side surface, which is not inspected by the first side surface inspecting machine 310, may be inspected by the second side surface inspecting machine 320. Like in the example described above, when the portion that rotates at an angle of 180 degrees on the side surface of the secondary battery 10 is inspected, a remaining portion that rotates at an angle of 180 degrees may be inspected. The range of the side surface of the secondary battery 10, which is inspected by the second side surface inspecting machine 320, is not limited thereto and thus, may change.

When the side surface inspecting device 300 includes the first side surface inspecting machine 310 and the second side surface inspecting machine 320, a portion that is not properly inspected in the side surface of the secondary battery 10 may be reduced to increase the efficiency of the inspection.

As an example of a component for disposing the secondary battery 10 to be in an appropriate state to be inspected, the outer appearance inspection system 1 according to Embodiment 1 of the present invention may include the rotating device 400.

The rotating device 400 may be disposed at the second inspection position 30, and may rotate the secondary battery 10 to allow the secondary battery 10 to be in a state appropriate for each of the inspections.

The rotating device 400 may include a first rotating machine 410 and a second rotating machine 420. The first rotating machine 410 may rotate the secondary battery 10 after the inspecting of the upper portion and the lower portion by the top and bottom inspecting device 200, into a state in which the side surface is inspectable by the first side surface inspecting machine 310, and the second rotating machine 420 may rotate the secondary battery 10 after the inspecting of the portion of the side surface by the first side surface inspecting machine 310, into a state in which the other portion of the side surface is inspectable by the second side surface inspecting machine 320.

The first rotating machine 410 may be disposed at an entrance of the second inspection position 30. Specifically, the first rotating machine 410 may be disposed at a position that the secondary battery 10 passes right before reaching the position, at which the first side surface inspecting machine 310 is disposed, at the second inspection position 30 of the path along which the secondary battery 10 is moved by the transfer device 100.

As described above, the first rotating machine 410 may rotate the secondary battery 10, which is inspected by the top and bottom inspecting device 200 in the lying state so that the longitudinal direction and the proceeding direction of the secondary battery 10 perpendicularly cross each other, so that the longitudinal direction of the secondary battery 10 and the traveling direction of the transfer device 100 are parallel to each other. For example, in FIG. 2a, when the secondary battery 10 is a cylindrical type, the secondary battery 10 may rotate in a lying state so that the axial direction thereof matches a left and right direction on FIG. 2a.

The second rotating machine 420 may be disposed between the first side surface inspecting machine 310 and the second side surface inspecting machine 320 at the second inspection position 30. For example, the secondary battery 10 may be transferred by the transfer device 100 in order of the first side surface inspecting machine 310, the second rotating machine 420, and the second side surface inspecting machine 320.

As described above, the second rotating machine 420 may rotate the secondary battery 10, which is inspected by the first side surface inspecting machine 310 in the lying state in which the longitudinal direction and the proceeding direction of the secondary battery 10 are parallel to each other, at an angle of 180 degrees so that a top surface and a bottom surface of the secondary battery 10 are reversed. For example, when the secondary battery 10 is a cylindrical type, the secondary battery 10 may rotate at an angle of 180 degrees so that the side surface of the secondary battery 10, which faces upward in the first side surface inspecting machine 310, faces the transfer device 100.

When the rotating device 400 includes the first rotating machine 410 and the second rotating machine 420, the secondary battery 10 may be disposed to be in the appropriate state to be inspected when the secondary battery 10 is disposed at each of the inspection positions by the transfer device 100. Accordingly, there may be an effect that the efficiency of the process increases.

As an example of a component for loading the secondary battery 10 to be inspected on the transfer device 100, the outer appearance inspection system 1 according to Embodiment 1 of the present invention may further include a loading device 500.

The loading device 500 may load as many as a preset number of the secondary battery 10 of which the outer appearance is inspected. For example, when the transfer device 100 is the conveyor including the linear motion guide 110, eight secondary batteries 10 may be loaded on a top surface of the block 112 that moves along the rail 111. In this case, the eight secondary batteries 10 may constitute one set and pass each of the inspection positions.

When loading device 500 may load as many as the preset number of the secondary battery 10 on the transfer device 100, a part of the process may be automated to increase the efficiency.

The secondary battery 10 to be inspected may be stored in a tray 40 before being loaded on the transfer device 100. Here, the outer appearance inspection system 1 may be provided with a tray inlet 510, through which the tray 40 in which the secondary batteries 10 to be loaded on the transfer device 100 through the loading device 500 are stored may enter, and a tray outlet 520 through which the empty tray 40 after the loading of all the stored secondary batteries 10 on the transfer device 100 by the loading device 500 may be discharged.

As an example of a component for discriminating defective secondary batteries 10 as a result of the inspections during the process, the outer appearance inspection system 1 according to Embodiment 1 of the present invention may further include a discriminating device 600.

The discriminating device 600 may discriminate the defective secondary batteries 10 in terms of the outer appearance on the basis of the results of inspecting the secondary battery 10, which are received from each of the inspecting devices. The secondary batteries 10 may be classified into a defective product and a good product by the discriminating device 600.

Figure 5:
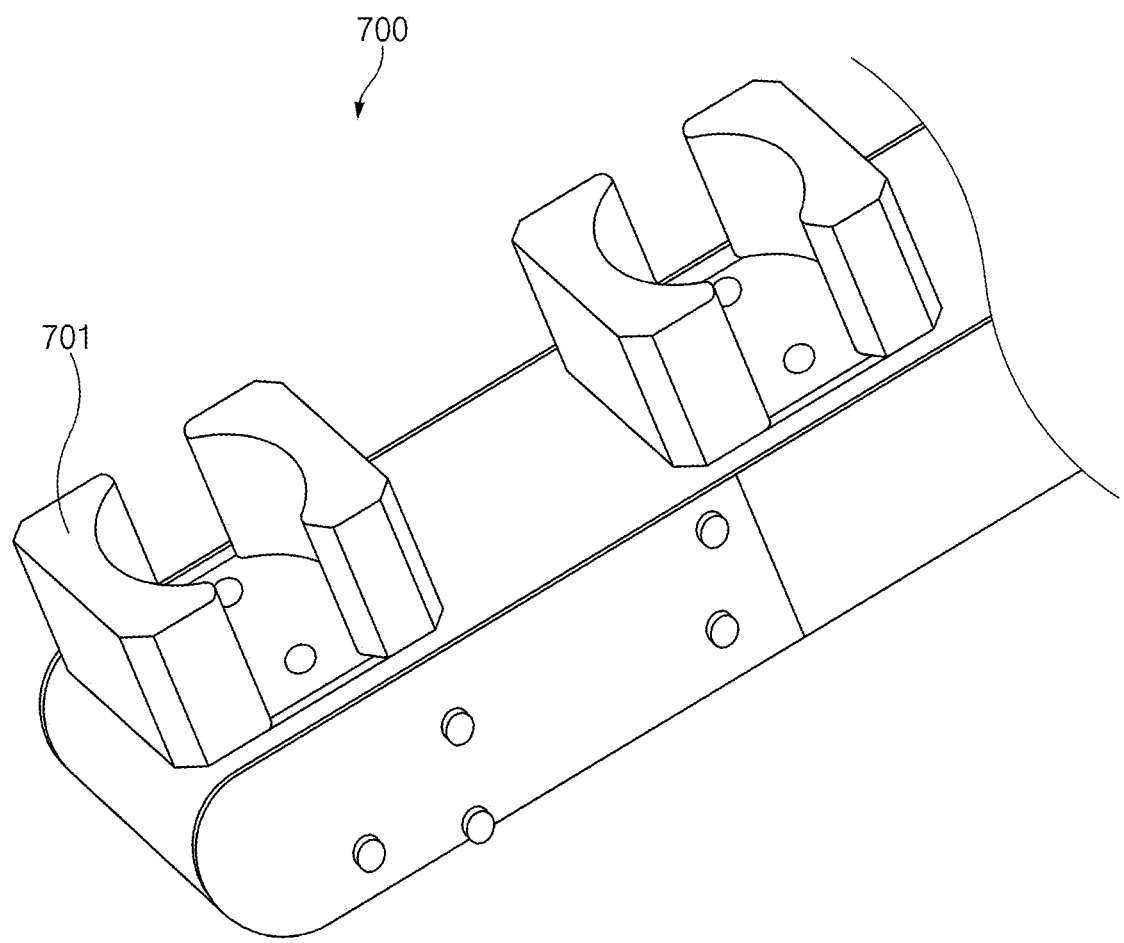
FIG. 5 is a schematic perspective view illustrating a first conveyor of an outer appearance inspection system according to Embodiment 1 of the present invention.

FIG. 5 is a schematic perspective view illustrating a first conveyor 700 of the outer appearance inspection system 1 according to Embodiment 1 of the present invention.

As an example of a component for transferring the secondary batteries 10 after completion of the discrimination, the outer appearance inspection system 1 according to Embodiment 1 of the present invention may further include a first conveyor 700.

The first conveyor 700 may be connected to the discriminating device 600 and transfer the secondary batteries 10, each of which is determined to be a defective product or a good product. Here, the first conveyor 700 may be a pocket conveyor including a pocket 701 in which each of the discriminated secondary batteries 10 may be put individually, in order to prevent problems that may occur during the transfer.

When each of the secondary batteries 10 is transferred in a state of being put in the pocket 701 individually, collision with other secondary batteries 10 may be prevented to reduce the likelihood that an additional problem may occur in the secondary batteries 10 that are normal as a result of the inspection, and prevent the secondary batteries 10, which are defective, from being mixed with the normal secondary batteries 10.

The outer appearance inspection system 1 may further include a second conveyor 800 capable of transferring the secondary batteries 10, which are found abnormal and determined to be defective according to the result of the inspection, among the secondary batteries 10 transferred by the first conveyor 700.

The second conveyor 800 may separate the secondary batteries 10, which are defective products, based on a discrimination result of the discriminating device 600. As the defective secondary batteries 10 need to be separated from the secondary batteries 10 transferred along the first conveyor 700 during the transfer, a conveyor using a magnetic property of a magnet, or the like, may be used as the second conveyor.

Additionally, the outer appearance inspection system 1 according to Embodiment 1 of the present invention may include other components necessary for the process. For example, the outer appearance inspection system 1 may further include a good product storage box 50, in which the secondary batteries 10 that are transferred along the first conveyor 700 and not abnormal as the result of the inspection are stored, and a defective product storage box 60 in which the secondary batteries 10 that are transferred by the second conveyor 800 and abnormal as the result of the inspection are stored.

In the outer appearance inspection system 1 according to Embodiment 1 of the present invention, shaking of the secondary batteries 10 may be minimized during the transfer and collision with the secondary batteries 10 may be prevented to increase stability. Moreover, the entire side surface of the secondary battery 10 may be inspected and detectability may be improved by the 3D inspection to reduce the false inspection. Accordingly, the efficiency of inspection may be increased.

Embodiment 2

The present invention provides, as Embodiment 2, an outer appearance inspection method that inspects an outer appearance of a cylindrical type secondary battery.

Figure 6:
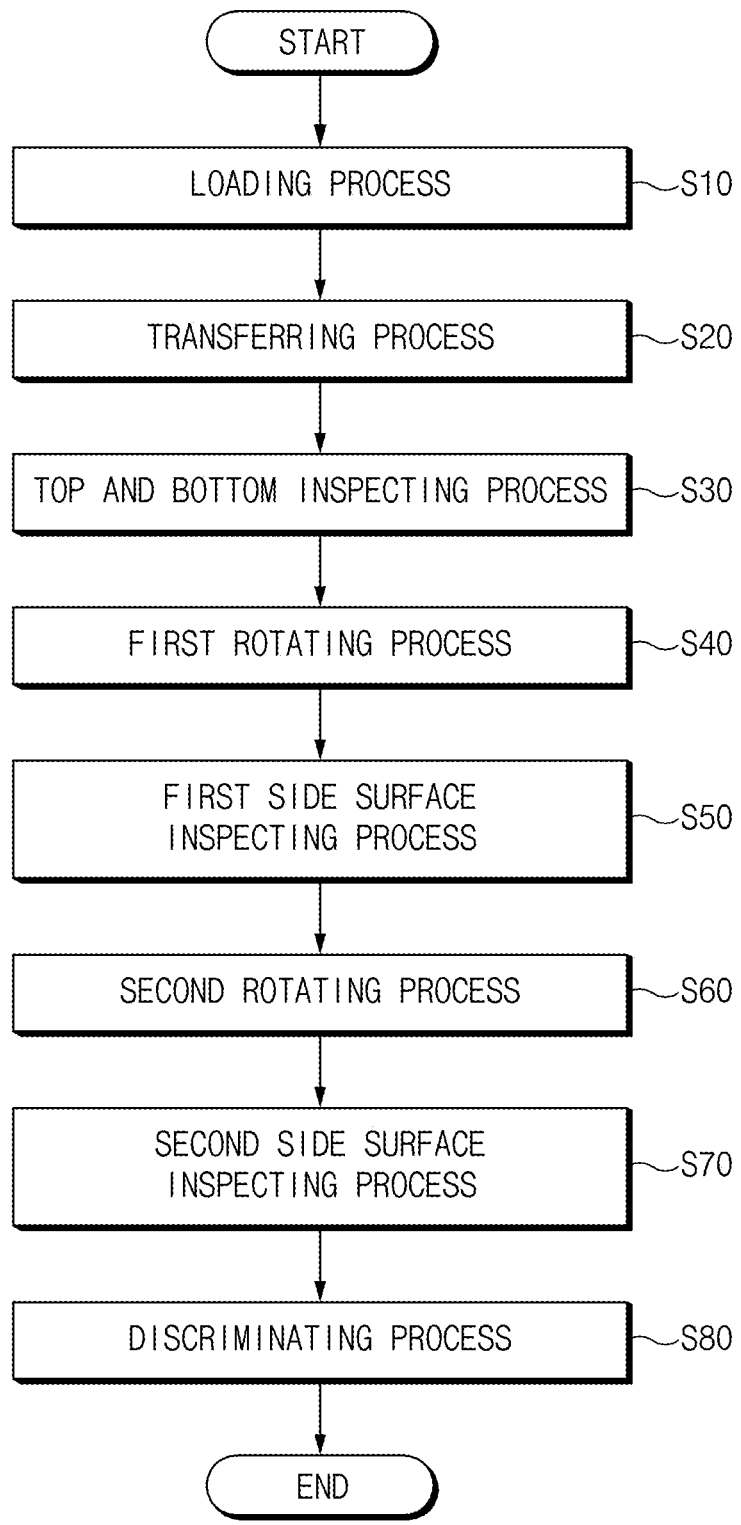
FIG. 6 is a flowchart illustrating an outer appearance inspection method according to Embodiment 2 of the present invention.

FIG. 6 is a flowchart illustrating an outer appearance inspection method according to Embodiment 2 of the present invention.

Hereinafter, the detailed descriptions of the same components as the components of the outer appearance inspection system 1 according to Embodiment 1 of the present invention will be omitted.

Referring to FIG. 6, the outer appearance inspection method according to Embodiment 2 of the present invention may start with a loading process (S10) of loading a secondary battery 10, of which an outer appearance is subject to inspection, on a transfer device 100 by a loading device 500.

As described in Embodiment 1, as many as a preset number of the secondary batteries 10 may be loaded on the transfer device 100 in the loading process. Here, the secondary battery 10 that is a cylindrical type may be loaded for a top and bottom inspection in a lying state so that an axial direction and a proceeding direction of the secondary battery 10 are perpendicular to each other.

When the specific number of secondary batteries 10 are loaded on the transfer device 100, a transferring process (S20) may be carried out in which the secondary battery 10 is transferred by the transfer device 100.

In the transferring process (S20) by the transfer device 100, the secondary battery 10 may move to each of inspection positions for the outer appearance inspection. That is, the outer appearance inspection method for the secondary battery 10 may be carried out in order according to traveling of the transfer device 100.

The transfer device 100 used in the transferring process (S20) of the outer appearance inspection method according to Embodiment 2 of the present invention may include a linear motion guide 110, and the secondary battery 10 may be transferred by a linear motion of the linear motion guide 110 in the transferring process (S20). Thus, shaking of the secondary battery 10 may be minimized in the transferring process (S20).

When the secondary battery 10 is transferred through the transferring process (S20), a top and bottom inspecting process (S30) may be carried out in which an upper portion and a lower portion are inspected by a top and bottom inspecting device 200. In the top and bottom inspecting process (S30), as described in Embodiment 1, the upper portion and the lower portion of the secondary battery 10 may be inspected for whether there are wrinkles, dents, scratches, foreign matters, contaminant, discoloration, short-circuit marks, or the like.

A first rotating process (S40), in which the secondary battery 10 that is a cylindrical type is rotated by a first rotating machine 410 so that the axial direction of the secondary battery 10 and a traveling direction of the transfer device 100 are parallel to each other, may carried out subsequently to the top and bottom inspecting process (S30).

Specifically, the secondary battery 10 may rotate at an angle of 90 degrees in the first rotating process (S40), and this is to change to a state of the secondary battery 10 for a first side surface inspection.

A first side surface inspecting process (S50), in which a portion of a side surface of the secondary battery 10 is inspected by a first side surface inspecting machine 310, may be carried out after the secondary battery 10 rotates at an angle of 90 degrees.

As the secondary battery 10 that is a cylindrical type has a side surface that is a curved shape, the first side surface inspecting machine 310 may be a device such as a 3D camera for efficient inspection.

A second rotating process (S60), in which the secondary battery 10 is rotated at an angle of 180 degrees by a second rotating machine 420 so that a top surface and a bottom surface of the secondary battery 10 are reversed, may be carried out after the first side surface inspecting process (S50).

In the second rotating process (S60), the secondary battery 100 in a lying state on a top surface of the transfer device 100 may rotate at the angle of 180 degrees and thus, a portion of the side surface, which is not inspected in the first side surface inspecting process (S50), may be prepared to be inspected.

A second side surface inspecting process (S70), in which the portion of the side surface of the secondary battery 10, which is not inspected in the first side surface inspecting process (S50), is inspected by a second side surface inspecting machine 320, may be carried out after the second rotating process (S60).

In the first side surface inspecting process (S50) and the second side surface inspecting process (S70), the side surface of the secondary battery 10 may be inspected for whether there are wrinkles, dents, scratches, rust, foreign matters, contaminant, discoloration, or the like, and whether other identifying phrases match a product. In addition, the secondary battery 10 may be inspected for defect through the inspection for swelling.

When the inspecting of the side surface of the secondary battery 10 is completed through the second side surface inspecting process (S70), the secondary battery 10 may be in a state in which all of the upper portion, the lower portion, and the side surface have been inspected.

Through the outer appearance inspection method according to the present invention, even the side surface of the cylindrical type secondary battery, which is a curved surface, may be efficiently inspected, and the entire outer appearance may be efficiently inspected during the process.

The outer appearance inspection method according to Embodiment 2 of the present invention may further include a discriminating process (S80) of discriminating the secondary battery 10 after the outer appearance inspection between a defective product and a good product on the basis of a result of each of the inspections.

Even an operation of separating the secondary battery 10, which is defective, may be carried out during the inspection process and thus, efficiency of the process may be increased by the discriminating process (S80).

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

1: Outer appearance inspection system
10: Secondary battery
20: First inspection position
30: Second inspection position
40: Tray
50: Good product storage box
60: Defective product storage box
100: Transfer device
110: Linear motion guide
111: Rail
112: Block
200: Top and bottom inspecting device
201: Camera
210: Upper portion inspecting machine
220: Lower portion inspecting machine
300: Side surface inspecting device
301: Light source device
302: Mirror
310: First side surface inspecting machine
320: Second side surface inspecting machine
400: Rotating device
410: First rotating machine
420: Second rotating machine
500: Loading device
510: Tray inlet
520: Tray outlet
600: Discriminating device
700: First conveyor
701: Pocket
800: Second conveyor

The invention claimed is:

1. An outer appearance inspection system configured to inspect an outer appearance of a secondary battery, the outer appearance inspection system comprising:
   a transfer device configured to transfer the secondary battery to an inspection position;
   a top and bottom inspecting device disposed at a first inspection position and configured to inspect an upper portion and a lower portion of the secondary battery;
   a side surface inspecting device disposed at a second inspection position and configured to inspect a side surface of the secondary battery for swelling; and
   a rotating device disposed at the second inspection position and configured to rotate the secondary battery, the rotating device comprising a first rotating machine disposed at an entrance of the second inspection position and configured to rotate the secondary battery so that a longitudinal direction of the secondary battery and a traveling direction of the transfer device are parallel to each other,
   wherein the side surface inspecting device is configured to inspect the side surface of the secondary battery while the secondary battery lies on the transfer device.

2. The outer appearance inspection system of claim 1, wherein the transfer device is a conveyor comprising a linear motion guide, and wherein the transfer device is configured to transfer the secondary battery by a linear motion of the linear motion guide.

3. The outer appearance inspection system of claim 1, wherein the top and bottom inspecting device comprises an upper portion inspecting machine configured to inspect the upper portion of the secondary battery, and a lower portion inspecting machine configured to inspect the lower portion of the secondary battery, and the top and bottom inspecting device has a camera therein.

4. An outer appearance inspection system configured to inspect an outer appearance of a secondary battery, the outer appearance inspection system comprising:
   a transfer device configured to transfer the secondary battery to an inspection position;
   a top and bottom inspecting device disposed at a first inspection position and configured to inspect an upper portion and a lower portion of the secondary battery;
   a side surface inspecting device disposed at a second inspection position and configured to inspect a side surface of the secondary battery for swelling while the secondary battery lies on the transfer device; and
a rotating device disposed at the second inspection position and configured to rotate the secondary battery,
wherein the side surface inspecting device is a 3D camera comprising a light source device configured to emit light towards the side surface of the secondary battery, and a mirror configured to reflect the light emitted by the light source device.

5. The outer appearance inspection system of claim 1, wherein the side surface inspecting device comprises:
a first side surface inspecting machine configured to inspect a first portion of the side surface of the secondary battery; and
a second side surface inspecting machine configured to inspect a second portion of the side surface of the secondary battery that is different from the first portion.

6. The outer appearance inspection system of claim 5, wherein the rotating device comprises a second rotating machine disposed between the first side surface inspecting machine and the second side surface inspecting machine, the second rotating machine being configured to rotate the secondary battery by an angle of 180 degrees so that an orientation of a top surface and a bottom surface of the secondary battery is reversed.

7. The outer appearance inspection system of claim 1, further comprising a loading device configured to load the secondary battery onto the transfer device.

8. The outer appearance inspection system of claim 1, further comprising a discriminating device configured to recognize the secondary battery according to an inspection result measured by the top and bottom inspecting device and the side surface inspecting device.

9. The outer appearance inspection system of claim 8, further comprising:
a first conveyor connected to the discriminating device and configured to transfer the secondary battery if the secondary battery is determined to be acceptable; and
a second conveyor connected to the first conveyor and configured to transfer the secondary battery if the secondary battery is determined to be abnormal.

10. The outer appearance inspection system of claim 9, wherein the first conveyor is a pocket conveyor comprising a pocket configured to receive the secondary battery therein.

11. An outer appearance inspection method for inspecting an outer appearance of a cylindrical type secondary battery, the outer appearance inspection method comprising:
a loading process of loading the secondary battery onto a transfer device using a loading device;
a transferring process of transferring the secondary battery using the transfer device;
a top and bottom inspecting process of inspecting an upper portion and a lower portion of the secondary battery using a top and bottom inspecting device;
a first rotating process of rotating the secondary battery using a first rotating machine so that a longitudinal direction of the secondary battery and a traveling direction of the transfer device are parallel to each other;
a first side surface inspecting process of inspecting a first portion of a side surface of the secondary battery using a first side surface inspecting machine;
a second rotating process of rotating the secondary battery at an angle of 180 degrees using a second rotating machine so that an orientation of a top surface and a bottom surface of the secondary battery are reversed; and
a second side surface inspecting process of inspecting a second portion of the side surface of the secondary battery that is different from the first portion, using a second side surface inspecting machine.

12. The outer appearance inspection method of claim 11, wherein, during the transferring process, the secondary battery is transferred by a linear motion of a linear motion guide of the transfer device.

13. The outer appearance inspection method of claim 11, wherein each of the first side surface inspecting machine and the second side surface inspecting machine is a 3D camera comprising a light source device configured to emit light towards the side surface of the secondary battery, and a mirror configured to reflect the light emitted by the light source device.

14. The outer appearance inspection method of claim 11, further comprising a discriminating process of recognizing the secondary battery after the inspecting of the outer appearance using a discriminating device according to a measured inspection result.

* * * * *